(12) United States Patent
Puskarich

(10) Patent No.: US 12,317,157 B2
(45) Date of Patent: May 27, 2025

(54) TRACKING SYSTEMS WITH ELECTRONIC DEVICES AND TAGS

(71) Applicant: Apple Inc., Cupertino, CA (US)

(72) Inventor: Paul G. Puskarich, Palo Alto, CA (US)

( * ) Notice: Subject to any disclaimer, the term of this patent is extended or adjusted under 35 U.S.C. 154(b) by 0 days.

(21) Appl. No.: 18/505,344

(22) Filed: Nov. 9, 2023

(65) Prior Publication Data
US 2024/0073648 A1 Feb. 29, 2024

Related U.S. Application Data

(63) Continuation of application No. 17/364,041, filed on Jun. 30, 2021, now Pat. No. 11,843,992.

(60) Provisional application No. 63/054,543, filed on Jul. 21, 2020.

(51) Int. Cl.
*H04W 4/029* (2018.01)
*G06N 20/00* (2019.01)
*G08B 21/24* (2006.01)
*H04W 4/38* (2018.01)
*H04W 4/80* (2018.01)

(52) U.S. Cl.
CPC ............ *H04W 4/029* (2018.02); *G06N 20/00* (2019.01); *G08B 21/24* (2013.01); *H04W 4/38* (2018.02); *H04W 4/80* (2018.02)

(58) Field of Classification Search
CPC .................................................... H04W 4/029
USPC ..................................................... 455/402.2
See application file for complete search history.

(56) References Cited

U.S. PATENT DOCUMENTS

| | | | |
|---|---|---|---|
| 5,804,810 A * | 9/1998 | Woolley | G06Q 10/08 235/383 |
| 8,810,392 B1 | 8/2014 | Teller et al. | |
| 9,911,290 B1 | 3/2018 | Zalewski et al. | |
| 10,448,211 B1 * | 10/2019 | Shen | G06K 7/10366 |
| 10,546,228 B2 | 1/2020 | Daoura et al. | |
| 10,573,134 B1 | 2/2020 | Zalewski et al. | |
| 11,156,693 B2 * | 10/2021 | O'Hagan | G01S 5/0244 |
| 11,315,393 B1 | 4/2022 | Zalewski et al. | |
| 2007/0203768 A1 * | 8/2007 | Adra | G01S 5/0294 340/572.1 |
| 2011/0266338 A1 * | 11/2011 | Babcock | G06Q 10/06 235/375 |

(Continued)

*Primary Examiner* — Qutbuddin Ghulamali
(74) *Attorney, Agent, or Firm* — Treyz Law Group, P.C.; Kendall P. Woodruff

(57) ABSTRACT

An electronic device may include wireless communications circuitry that receives location information from tags that are coupled to different items. The electronic device may keep track of the different items using the tags. The electronic device may include control circuitry that analyzes historical tracking data from the tags to identify patterns and relationships between the tags. Based on the historical tracking data, the control circuitry may classify some tagged items as bags for other tagged items and may automatically alert the user when a tagged item is missing from its bag. The control circuitry may generate rules based on the historical tracking data, such as rules regarding acceptable ranges between tagged items and acceptable ranges between tagged items and the electronic device. The control circuitry may determine when to provide real-time location information and other notifications for a tagged item based on the historical tracking data.

19 Claims, 9 Drawing Sheets

(56) References Cited

U.S. PATENT DOCUMENTS

| | | | |
|---|---|---|---|
| 2012/0303498 A1* | 11/2012 | Cova | G06Q 10/08 |
| | | | 340/572.1 |
| 2015/0356332 A1 | 12/2015 | Turner et al. | |
| 2016/0006577 A1* | 1/2016 | Logan | H04W 4/80 |
| | | | 700/276 |
| 2016/0314429 A1* | 10/2016 | Gillen | H04L 67/563 |
| 2020/0080858 A1* | 3/2020 | Werner | G01C 21/3484 |
| 2020/0126370 A1* | 4/2020 | Zalewski | H04W 4/80 |
| 2022/0053296 A1 | 2/2022 | Klinkner et al. | |
| 2022/0269920 A1* | 8/2022 | Valencia | G08B 31/00 |

* cited by examiner

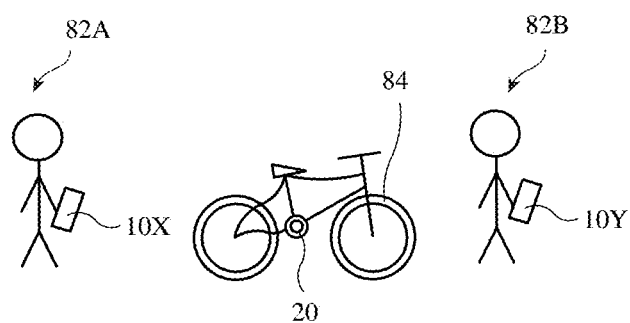
*FIG. 8*
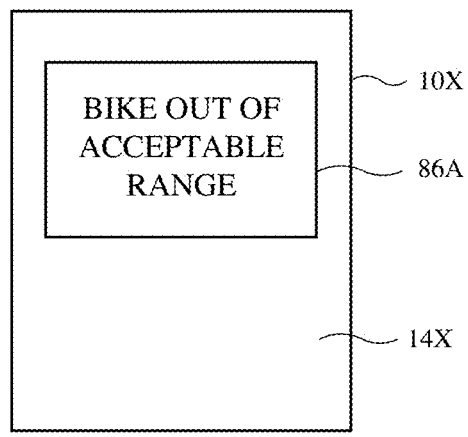
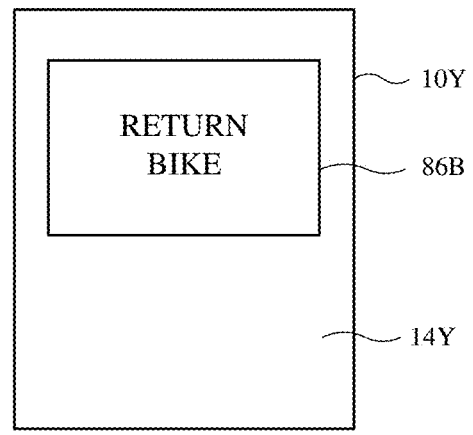
*FIG. 9*  *FIG. 10*

TRACKING SYSTEMS WITH ELECTRONIC DEVICES AND TAGS

This application is a continuation of U.S. patent application Ser. No. 17/364,041, filed Jun. 30, 2021, which claims the benefit of U.S. provisional patent application No. 63/054,543, filed Jul. 21, 2020, both of which are hereby incorporated by reference herein in their entireties.

FIELD

This relates generally to electronic devices and, more particularly, to electronic devices and tags that are used to track items.

BACKGROUND

Tracking devices are sometimes used to keep track of a user's items. For example, a user may attach a tracking device to a set of keys and may be able to determine the location of the keys using an electronic device that receives tracking information from the tracking device.

Conventional tracking systems may be unsatisfactory for a user. Tracking applications on electronic devices typically have limited functionality, and it may be cumbersome for the user to individually track multiple tracking devices attached to different items.

SUMMARY

An electronic device may be provided with wireless communications circuitry. The wireless communications circuitry may include one or more antennas. The antennas may be configured to receive IEEE 802.15.4 ultra-wideband communications signals and/or millimeter wave signals. The antennas may also include wireless local area network antennas, satellite navigation system antennas, cellular telephone antennas, and other antennas.

The wireless communications circuitry may receive location information from tags that are coupled to different items. Each tag may include a radio-frequency transmitter such as an ultra-wideband radio frequency transmitter that transmits signals to the electronic device. The electronic device may determine the location of each tag based on the received signals. A user may attach multiple tags to various items and may keep track of the tagged items using the electronic device.

The electronic device may include control circuitry that analyzes historical tracking data from the tags to identify patterns and relationships between the tags. Based on the historical tracking data, the control circuitry may classify some tagged items as bags for other tagged items and may automatically alert the user when a tagged item is missing from its bag. The control circuitry may generate other rules based on the historical tracking data, such as rules regarding acceptable ranges between tagged items and acceptable ranges between tagged items and the electronic device. The control circuitry may determine when to provide real-time location information for a tagged item based on the historical tracking data and the rules.

BRIEF DESCRIPTION OF THE DRAWINGS

FIG. 8 is a diagram showing how a tag may be used to track an item shared between multiple users in accordance with an embodiment.

FIG. 9 is a front view of an illustrative electronic device displaying a notification for a first user in accordance with an embodiment.

FIG. 10 is a front view of an illustrative electronic displaying a notification for a second user in accordance with an embodiment.

DETAILED DESCRIPTION

Figure 1:
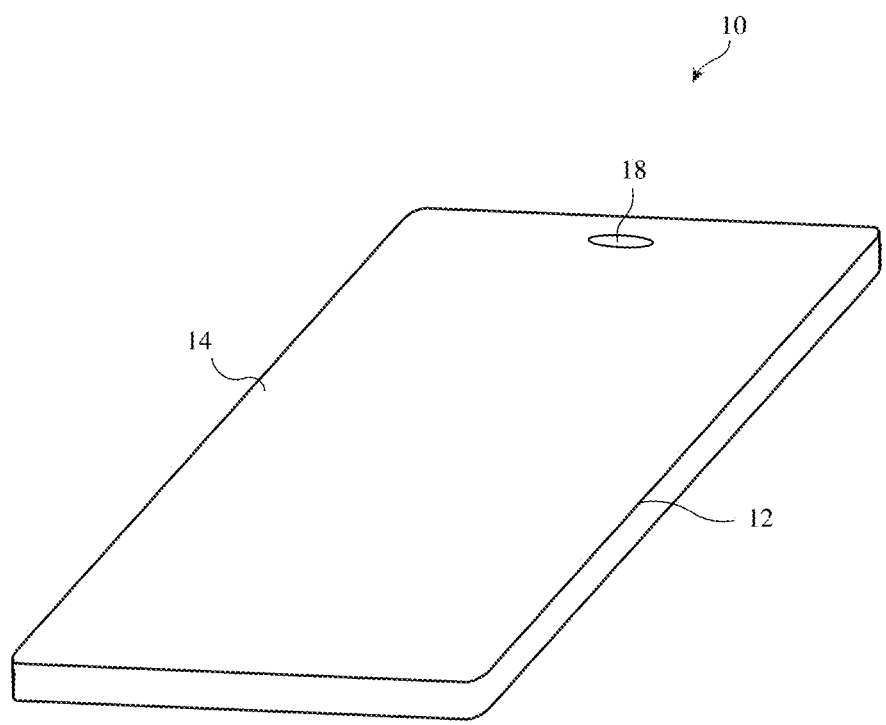
FIG. 1 is a perspective view of an illustrative electronic device that may be used to keep track of tags and associated tagged items accordance with an embodiment.

An electronic device may be used to gather tracking data from one or more tags (sometimes referred to as tracking devices, low-power radio-frequency signal transmitters, beacons, etc.). The tags may be coupled to items such as a user's keys, wallet, purse, backpack, shoes, sunglasses, a pet collar, suitcase, a piece of clothing, or any other suitable item. The tags may be used to gather information about the person or object that the electronic device is attached to (e.g., location information, activity information, identification information, medical or biometric information, etc.), may be used to gather user input (e.g., touch input, force input, motion input, and/or voice input), may be used to provide a user with output (haptic output, audio output, and/or visual output), may be used to store identification information about the person or object that the tag is attached to, may be used to store messages for a user, may be used as an anchor or visual marker in an augmented reality or virtual reality system, and/or may be used for other functions.

An electronic device may include control circuitry that gathers and processes tag data received from the tags. The tag data may include location information (e.g., historical location data indicating where the tag previously traveled to over a given period of time, real-time location information indicating where the tag is currently located, and/or other location information), user input information (e.g., user input provided to the tag), sensor data (e.g., sensor data gathered with one or more sensors in the tag), and/or other data collected by the tag and provided to the electronic device. The control circuitry may process the tag data to identify patterns and to create rules based on the identified patterns. For example, the tag data may include historical location information for different tagged items that the tags are attached to, and the control circuitry in the electronic device may analyze the historical location information to identify patterns and relationships between the tags, such as which tagged items tend to serve as "containers" for other tagged items, which tagged items tend to accompany other tagged items to certain locations frequented by the user, which tagged items tend to remain in the user's physical possession, which tagged items tend to remain at certain locations frequented by the user, and/or other patterns or information. If desired, the control circuitry may employ machine learning techniques to identify patterns in the historical location data and other tag data.

Based on the patterns that the control circuitry identifies in the tag data, the control circuitry may create rules to facilitate the user's interactions with the electronic device, the tags, and the tagged items that the tags are attached to. A rule may indicate an acceptable distance between tagged items, an acceptable distance between a tagged item and the electronic device, which tagged items should remain within a given distance of one another, which tagged items should be brought to which locations, which tagged items should remain in which locations, which tagged items should remain with the user, which tagged items should be contained within or attached to other tagged items, etc. The control circuitry may monitor tag data and may take the appropriate action to ensure that the rules are met. For example, based on the historical tracking data, the control circuitry may set a rule that the user's keys (a first tagged item) and the user's wallet (a second tagged item) should remain within some maximum allowable distance of one another. The control circuitry may provide a notification to the user (e.g., using a display, speaker, haptic output device, etc.) when the keys and wallet become separated by an amount greater than the maximum allowable distance. As another example, based on historical tracking data, the control circuitry may set a rule that the user's gym bag (a first tagged item) serves as a container for the user's gym shoes (a second tagged item). When the control circuitry predicts that the user will soon be headed to the gym (e.g., based on historical tracking data from tags and/or from the user's cellular telephone or other electronic device), the control circuitry may automatically notify the user of the location of his or her gym bag as well as the location of items that typically travel with the gym bag, such as the gym shoes or other workout gear.

Tags may also be used to keep track of items that are shared between multiple users. Each user may have an electronic device that receives location information from the tag that is coupled to the shared item. Each electronic device may apply rules and take actions with respect to location data. For example, the electronic devices may facilitate micro-contracts or other agreements between users with respect to the shared item to ensure that the shared item is handled according to a set of mutually agreed upon rules. This may include, for example, providing notifications to the different users of a shared item to ensure that those rules are met.

An electronic device such as electronic device 10 of FIG. 1 may be configured to receive and process data from one or more tags. Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, internet-supplying networking equipment such as a router, a wireless access point, a server, a modem, a base station, equipment that implements the functionality of two or more of these devices, or other electronic equipment. In the illustrative configuration of FIG. 1, device 10 is a portable device such as a cellular telephone, a wristwatch device, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. Buttons such as button 16 may also be formed from capacitive touch sensors, light-based touch sensors, or other structures that can operate through the display cover layer without forming an opening.

If desired, an opening may be formed in the display cover layer to accommodate a port such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings such as plastic-filled openings may be formed in metal portions of housing 12 such as in metal sidewall structures (e.g., to serve as antenna windows and/or to serve as gaps that separate portions of antennas from each other).

Figure 2:
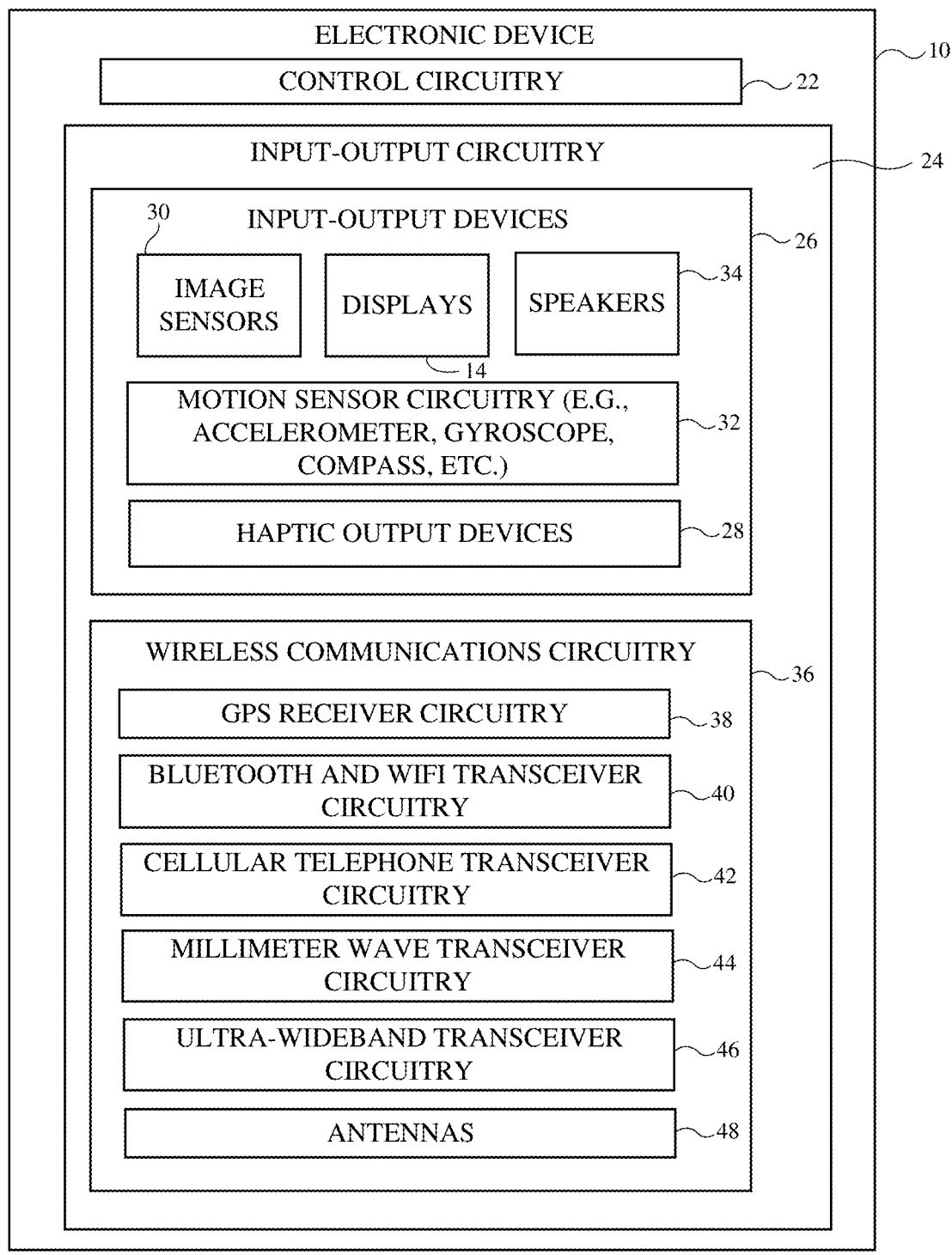
FIG. 2 is a schematic diagram of an illustrative electronic device that may be used to keep track of tags and associated tagged items in accordance with an embodiment.

A schematic diagram of illustrative components that may be used in device 10 is shown in FIG. 2. As shown in FIG. 2, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. Control circuitry 22 may also be used to run tag software on device 10 that is used to gather and process data received from one or more tags or other tracking devices. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more displays 14 (e.g., touch screens or displays without touch sensor capabilities), one or more image sensors 30 (e.g., digital image sensors), motion sensors 32, and speakers 34. Input-output devices 26 may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 30 may include one or more visible digital image sensors (visible-light cameras) and/or one or more infrared digital image sensors (infrared-light cameras). Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors) in device 10. If desired, control circuitry 22 may use display 14 to display a visual representation of the mapped environment.

Input-output devices 26 may include motion sensor circuitry 32. Motion sensor circuitry 32 may include one or more accelerometers (e.g., accelerometers that measure acceleration along one, two, or three axes), gyroscopes, barometers, magnetic sensors (e.g., compasses), and other sensor structures. Sensors 32 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 22 may be used to store and process motion sensor data from sensors 32. If desired, motion sensors, processing circuitry, and storage that form motion sensor circuitry may form part of a system-on-chip integrated circuit (as an example).

Input-output devices 26 may include haptic output devices 28. Haptic output devices 28 can produce sensations on the user's body (e.g., the user's fingers, hands, etc.). Haptic output devices 28 may include actuators such as electromagnetic actuators, motors, piezoelectric actuators, electroactive polymer actuators, capacitive actuators, vibrators, linear actuators (e.g., linear resonant actuators), rotational actuators, actuators that bend bendable members, actuator devices that create and/or control repulsive and/or attractive forces between device 10 and other objects (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between device 10 and other objects).

Haptic output devices 28 may include vibrators that are actuated to issue haptic alerts, haptic notifications, haptic feedback, and/or other haptic output to a user of device 10. For example, haptic output devices 28 may be used to provide a received text message notification, a received telephone call notification, a received email notification, an alarm notification, a calendar notification, or any other desired notification. Haptic output from devices 28 may also be associated with place-related information and services. For example, haptic output devices 28 may be used to notify a user of available or updated place-related information and services, may be used to guide a user through a place, and/or may be used to provide other haptic output associated with place-related information and services.

Other sensors that may be included in input-output devices 26 include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (slight detection and ranging) sensors, radar sensors, and other suitable sensors.

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive RF components, one or more antennas 48, transmission lines, and other circuitry for handling RF wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.11ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band, a 6.5 GHz frequency band, an 8 GHz frequency band, and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic.

Figure 3:
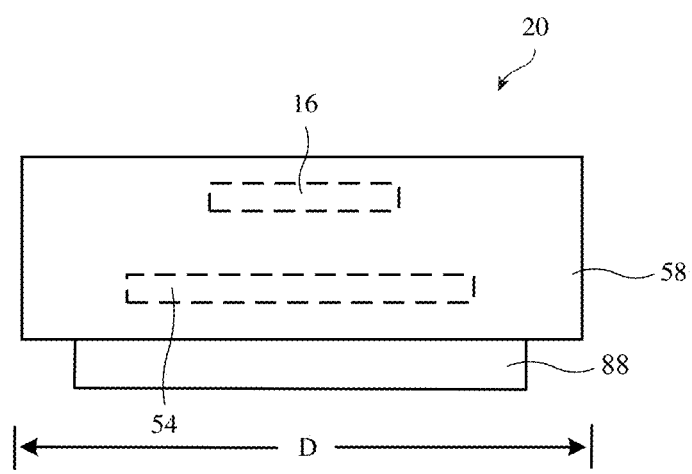
FIG. 3 is a side view of an illustrative tag in accordance with an embodiment.

FIG. 3 is a side view of an illustrative tag. Tag 20 (sometimes referred to as tracking device 20, low-power transmitter 20, transmitter 20, device 20, etc.) may be worn by or coupled to a person (e.g., a person's wrist, arm, finger, arm, neck, waist, ankle, or other suitable body part), may be worn or coupled to an animal (e.g., cat, dog, etc.), or may be coupled to an object (e.g., a suitcase, key fob, wallet, shoes, clothing, a door knob, an electronic device, or any other suitable object). Tag 20 may be configured to communicate with one or more additional electronic devices such as electronic device 10 of FIGS. 1 and 2 (e.g., a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, or equipment that implements the functionality of two or more of these devices).

With one illustrative configuration, which may sometimes be described herein as an example, tag 20 is small tracking device coupled to a person, animal, or object (e.g. using a removable case, adhesive, or any other suitable attachment structure). Tag 20 may have a circular shape, a round shape, an oval shape, a rectangular shape, and/or other suitable shape. Tag 20 may have a lateral dimension D between 25 mm and 50 mm, between 50 mm and 100 mm, between 10 mm and 200 mm, between 5 mm and 75 mm, less than 50 mm, or greater than 50 mm.

Tag 20 may communicate with one or more electronic devices 10 such as cellular telephone, tablet computer, laptop computer, wristwatch device, head-mounted device, a device with a speaker, or other electronic device (e.g., a device with a display, audio components, and/or other output components). The one or more electronic devices 10 that communicate with tag 20 may sometimes be referred to as host devices. The host devices may run software that is used to track the location of tag 20, send control signals to tag 20, receive data from tag 20, and/or perform other functions related to the operation of tag 20.

In the example of FIG. 3, tag 20 includes a housing such as housing 58. Housing 58, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 58 may be formed using a unibody configuration in which some or all of housing 58 is machined or molded as a single structure or may be formed using multiple structures (e.g., an internal frame structure, one or more structures that form exterior housing surfaces, etc.).

Tag 20 may include one or more energy storage devices 54. Energy storage devices 54 may include batteries and capacitors. Capacitors for energy storage may be based on supercapacitor structures. Devices 54 may, for example, include super capacitor(s) such as electrostatic double-layer capacitors. Electrostatic double-layer capacitors (sometimes referred to as electrostatic double-layer supercapacitors) are electrochemical capacitors in which energy is stored in a capacitor formed from relatively large electrodes that are bathed in electrolyte and separated by a small distance, allowing the capacitor to achieve high energy storage capacities.

Energy storage device 54 may be charged via a wired connection or, if desired, tag 20 may charge energy storage device 54 using wirelessly received power (e.g., inductive wireless power transfer, using capacitive wireless power transfer, and/or other wireless power transfer configurations). In some arrangements, which may sometimes be described herein as an example, energy storage device 54 is a removable battery that can be replaced. Housing 58 may include a door such as battery door 88 through which energy storage device 54 may be accessed. When it is desired to replace energy storage device 54 with a new battery, a user or other individual may open door 88, remove battery 54, place a new battery in housing 58, and close door 88. This is, however, merely illustrative. If desired, energy storage device 54 may be charged wirelessly or via a wired connection.

Tag 20 may include electrical components 16 mounted in housing 58. Electrical components 16 may include integrated circuits, discrete components, light-emitting components, sensors, and/or other circuits and may, if desired, be interconnected using signal paths in one or more printed circuits. If desired, one or more portions of the housing walls may be transparent to light and/or sound (e.g., so that light associated with an image on a display or other light-emitting or light-detecting component can exit housing 58, so that sound from a speaker in tag 20 can exit housing 58, etc.).

Electrical components 16 may include control circuitry. The control circuitry may include storage and processing circuitry for supporting the operation of tag 20. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of tag 20. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow tag 20 to communicate with other electronic devices such as device 10. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 16.

Input-output circuitry in components 16 of tag 20 may be used to allow data to be supplied to tag 20 and to allow data to be provided from tag 20 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of tag 20 (e.g., the input-output circuitry of components 16) may include sensors. Sensors for tag 20 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display). If desired, tag 20 may not include a display and may, in general, include fewer input-output devices than device 10.

If desired, the sensors in tag 20 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 16 may include mechanical devices for gathering input (e.g., buttons, joysticks, scrolling wheels, key pads with movable keys, keyboards with movable keys, and other devices for gathering user input). During operation, tag 20 may use sensors and/or other input-output devices in components 16 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of tag 20 can then take action based on this gathered information (e.g., by transmitting the information over a wired or wireless path to external equipment, by supplying a user with output using a haptic output device, visual output device, an audio component, or other input-output device in housing 58, etc.).

In one illustrative arrangement, which is sometimes described herein as an example, component 16 is a speaker that emits sound through housing 58 (e.g., through perforations in housing 58 or other sound-transparent regions of housing 58). A speaker in tag 20 may, for example, emit sound to help guide a user to the location of tag 20 (and thus the location of the object, animal, or person that tag 20 is coupled to).

If desired, tag 20 may have some or all of the same circuitry as electronic device 10 of FIG. 2 and/or may have additional or different circuitry than that shown in FIG. 2. For example, tag 20 may include a low-power transmitter (e.g., a Bluetooth® Low Energy transmitter, an ultra-wideband radio frequency signal transmitter, an RFID transmitter, or other transmitter) and a battery, but may have fewer input-output devices than a cellular telephone (e.g., may not include a display). Because tracking devices such as device 20 of FIG. 3 may sometimes be referred to as tags, the items to which the tags are attached may sometimes be referred to as "tagged items."

Figure 4:
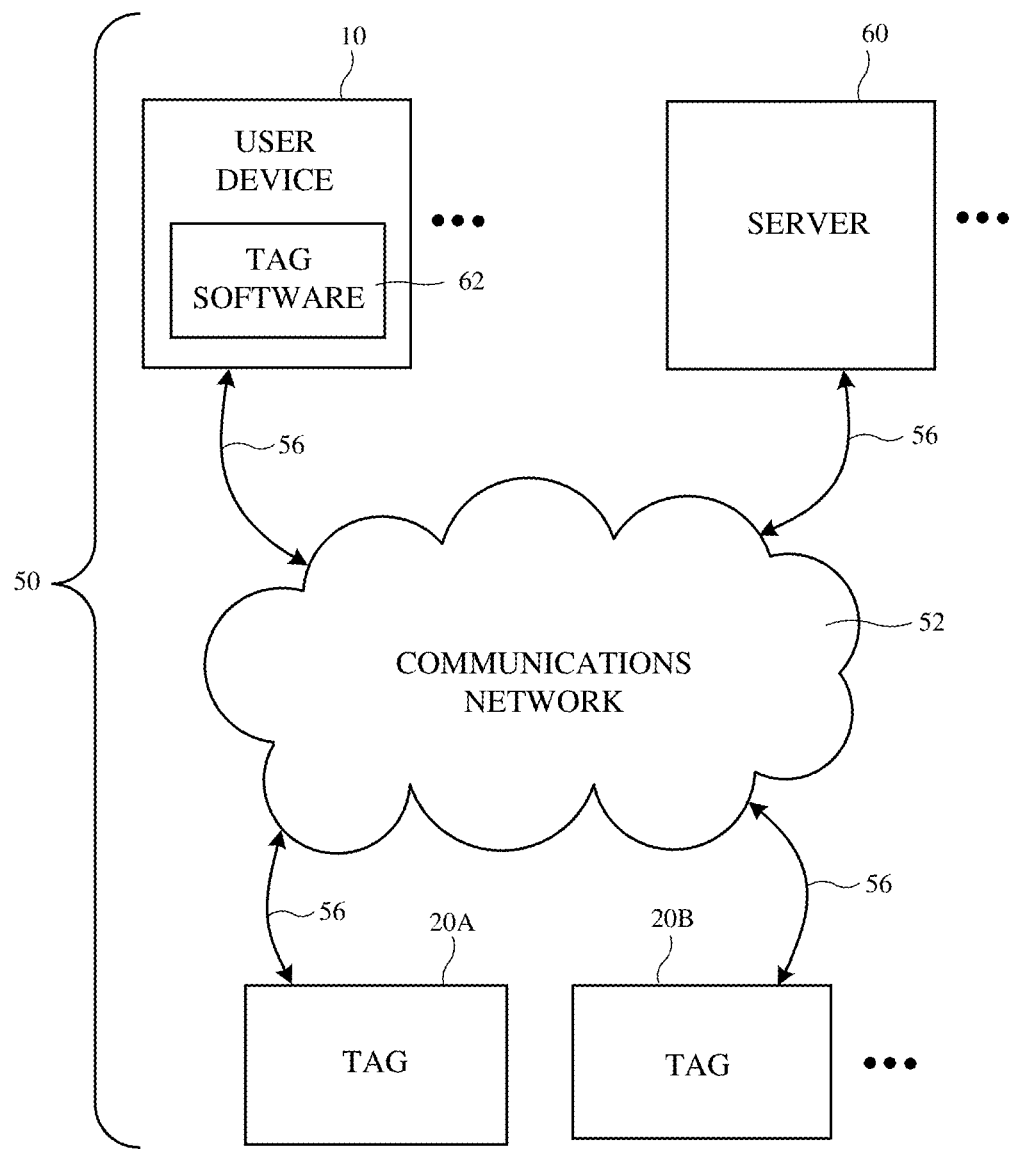
FIG. 4 is a diagram of an illustrative system in which electronic devices, servers, and tags communicate with one another over a communications network in accordance with an embodiment.

FIG. 4 is a diagram of an illustrative system that may be used to gather and process data associated with one or more tags such as tag 20 of FIG. 3. System 50 may include one or more electronic devices 10 that communicate with one another over a communications network such as communications network 52. Electronic devices 10 may have some or all of the circuitry of electronic device 10 of FIG. 2 and/or may have additional or different circuitry than that shown in FIG. 2.

Electronic devices 10 in system 50 may include electronic devices associated with one or more users such as a cellular telephone, a wristwatch device, a tablet computer, a head-mounted device, or other electronic device. A user may have multiple electronic devices 10. For example, a user may have a cellular telephone as a first electronic device 10, a wristwatch device as a second electronic device 10, a tablet computer as a third electronic device 10, etc.

System 50 may include one or more tags 20 such as tag 20A, tag 20B, etc. Each tag 20 may be coupled to an item. Tags 20 such as tags 20A and 20B may be adhesively attached to items, looped around or tied to items, located inside of items, sewn or stitched to items, magnetically attached to items, hooked onto items, and/or otherwise removably or permanently coupled to items. Tagged items that may be provided with an associated tag 20 may include any suitable object, person, or animal. For example, tags 20 may be coupled to key fobs, key chains, wallets, shoes, bags, backpacks, purses, notebooks, books, pens, pet collars, clothing, hats, glasses, sunglasses, headphones, water bottles, etc.

Electronic equipment 60 in system 50 may include internet-supplying networking equipment such as a server, a router, a wireless access point, a modem, a base station, or other electronic equipment. Each server 60 may include one or more physical servers and/or one or more virtual servers (e.g., cloud servers) that provide services such as web hosting, data hosting and sharing, software, and/or applications via the internet. Servers 60 may be controlled by a user, may be controlled by a company, may be controlled by a network administrator, and/or may be controlled by any other suitable party.

Tags 20 in system 50 such as tags 20A and 20B may be used to gather tag data. The tag data may include location information (e.g., historical location data indicating where tag 20 previously traveled to over a given period of time, real-time location information indicating where tag 20 is currently located, and/or other location information), user input information (e.g., user input provided to tag 20), sensor data (e.g., sensor data gathered with one or more sensors in tag 20), and/or other data collected by tag 20. Devices 10 may receive the tag data over communications network 52. In some scenarios, the tag data may be transmitted from tags 20 to servers 60. Servers 60 may process the tag data and provide the processed tag data to device 10, and/or servers 60 may transmit raw unprocessed tag data to device 10.

In other scenarios, tags 20 may transmit tag data directly to devices 10. For example, tag 20 may include a low-power transmitter (e.g., a Bluetooth® Low Energy transmitter, a ultra-wideband radio-frequency signal transmitter, an RFID transmitter, or other transmitter) that transmits signals such as signals 56. Device 10 may have a corresponding receiver (e.g., ultra-wideband signal receiver) that detects the transmitted signals from tag 20 and may have control circuitry that determines the location of (and/or other information about) the tag 20 based on the received signals. In some arrangements, tag 20 may not include an internal power source and may instead be powered by electromagnetic energy (e.g., radio frequency waves) from device 10 or other device. In other arrangements, tag 20 may include an internal power source.

Electronic devices in system 50 such as devices 10 may serve as host devices that run tag software 62 that is used to track the location of tags 20, send control signals to tags 20, receive data from tags 20, and/or perform other functions related to the operation of tags 20. Because electronic devices 10 are generally in a user's possession, electronic devices 10 may sometimes be referred to as user electronic devices 10.

Electronic devices in system 50 such as user electronic devices 10, servers and other electronic equipment 60, and tags 20 may communicate with one another over communications network 52. Communications network 52 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), switches, routers, servers, modems, repeaters, telephone lines, network cards, line cards, communications gateways, portals, user equipment (e.g., computing devices, mobile devices, etc.), wireless access points, base stations, some or all of a network of communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc.

Electronic devices in system 50 such as user electronic devices 10, servers and other electronic equipment 60, and tags 20 may communicate over network 52 using communications signals 56. Communications signals 56 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 56 may be used to convey information such as location and orientation information. For example, control circuitry 22 in electronic device 10 may determine the location of tags 20 using wireless signals 56 (e.g., using signal strength measurement schemes by measuring the signal strength of radio signals from tag 20, using time based measurement schemes such as time of flight measurement techniques, time difference of arrival measurement techniques, angle of arrival measurement techniques, triangulation methods, time-of-flight methods, using a crowdsourced location database, other suitable measurement techniques, etc.). Control circuitry 22 may also use image data from image sensors 30, motion sensor data from motion sensors 32, and other sensor data (e.g., proximity data from a proximity sensor, etc.) to determine the location of tags 20 in system 50.

If desired, system 50 may include one or more passive items that do not emit or receive radio-frequency signals such as furniture, buildings, doors, windows, walls, people, pets, and other items. Passive items in system 50 may be items that one or more of devices 10 recognizes through feature tracking (e.g., using image sensor 30) and/or through location tracking. For example, control circuitry 22 in one or more of devices 10 may construct a virtual three-dimensional map of an environment (or may receive and store a previously-constructed three-dimensional map of an environment) and may assign objects or locations in the environment a set of coordinates (e.g., geographical coordinates, Cartesian coordinates, horizontal coordinates, spherical coordinates, or other suitable coordinates) in the three-dimensional map. In some arrangements, the virtual three-dimensional map may be anchored by one or more items with a known location (e.g., may be anchored by one or more devices 10). Control circuitry 22 may assign coordinates to passive items based on where the passive item is located relative to the anchored devices in system 50. Control circuitry 22 may store the coordinates of passive items and may take certain actions when device 10 is in a certain location or orientation relative to a passive item. For example, if a user points his or her device 10 towards a location having stored coordinates associated with a passive item, control circuitry 22 in device 10 may recognize that device 10 is being pointed towards the passive item and may take certain actions (e.g., may display information associated with the item on display 14, may provide audio output via speakers 34, may provide haptic output via haptic output devices 28, and/or may take other suitable action). Because passive items do not send or receive communication signals, circuitry 22 may use image data from image sensors 30, motion sensor data from motion sensors 32, and other sensor data (e.g., proximity data from a proximity sensor, etc.) to determine the location of passive items and/or to determine the orientation of device 10 relative to passive items (e.g., to determine when device 10 is being pointed towards a passive item).

Some or all of the devices in system 50 such as user electronic devices 10, servers and other electronic equipment 60, and tags 20 may run application software for gathering and/or providing tag-related information. For example, devices 10 may run tag software 62. Control circuitry 22 on device 10 may execute tag software 62 to gather and process data from tags 20 such as tags 20A and tag 20B. Control circuitry 22 may also use tag software 62 to provide tag-related output to a user (e.g., real-time location updates for tags 20, notifications regarding tags 20, alerts regarding tags 20, and/or other tag-related output).

Figure 5:
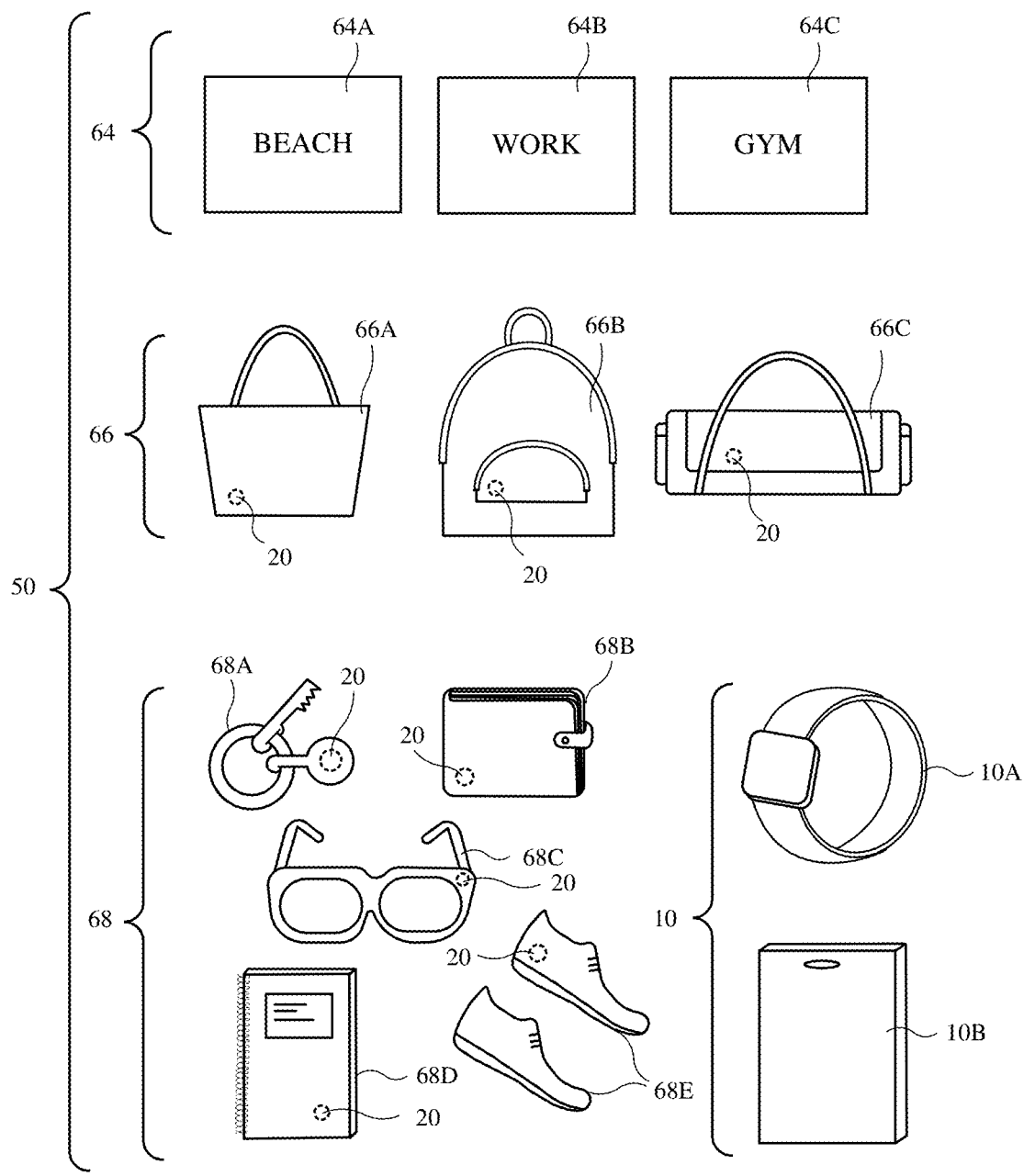
FIG. 5 is a diagram of an illustrative system in which electronic devices, tags, and associated tagged items travel to different locations with a user in accordance with an embodiment.

FIG. 5 is a diagram of system 50 with illustrative locations 64, tags 20, tagged items 66, tagged items 68, and electronic devices 10. Control circuitry 22 in one or more of electronic devices 10 may be used to gather tracking information and other data from tags 20 as the user moves between different locations 64 and as tagged items 66 and 68 move between different locations 64. Locations 64 may correspond to different places that the user visits, such as a beach at location 64A, a user's place of work at location 64B, and a gym at location 64C. These are merely illustrative examples of the types of locations 64 that may be visited by a user. In general, tracking data may be gathered when the user visits any suitable place 64 (e.g., an airport or other transportation facility, a restaurant or other eating establishment, a grocery store, a retail store, a home, a museum, a campus, a building location, etc.).

Electronic devices 10 in system 50 such as devices 10A and 10B may be portable electronic devices that are used to obtain tracking information and other data from tags 20. In the example of FIG. 5, electronic device 10A is a wristwatch device and electronic device 10B is a cellular telephone. These are merely illustrative examples of the types of devices 10 that a user may use to gather data from tags 20. In general, devices 10 may include any suitable electronic device (e.g., as described in connection with FIGS. 1 and 2). Control circuitry 22 in one or more of devices 10 (e.g., one or both of electronic devices 10A and 10B) may be used to gather location information and other data from tags 20, location information, sensor data, and other data from input-output circuitry 24 (e.g., image sensors 30, motion sensor circuitry 32, wireless communications circuitry 36, etc.) in one or both of devices 10A and 10B, and/or other data from other sources (e.g., server 60 of FIG. 4). Based on this data, control circuitry 22 may provide output to a user using output devices in one or more of devices 10 (e.g., one or both of devices 10A and 10B). This may include, for example, providing notifications or other visual output using display 14, audio output with speakers 34, haptic output with haptic output devices 28, etc.

Because devices 10 generally remain close to a user, devices 10 may be used as a proxy for the user. In particular, control circuitry 22 may use location data associated with one or more of devices 10 (e.g., one or both of devices 10A and 10B) as an estimate for the location of the user. For example, if device 10A and/or device 10B is at the beach at location 64A, control circuitry 22 may assume that the user is also at the beach at location 64A. Control circuitry 22 may rely upon user input to indicate which of devices 10 should be used as a proxy for the user (e.g., a user may manually select a particular electronic device as a primary electronic device that should be used to estimate the location of the user), and/or control circuitry may automatically determine which device 10 should primarily be used to determine the location of the user (e.g., based on which device moves around the most, which device is used the most, etc.). Arrangements in which control circuitry 22 automatically updates or changes which device 10 is used as a proxy for the user (e.g., based on the user's activity, location, etc.) may also be used. For example, control circuitry 22 may use wristwatch device 10A as a proxy for the user's location when the user is cycling, and may use cellular telephone 10B as a proxy for the user's location when the user is at work (location 64B).

Tagged items 66 and 68 may be any suitable object, person, or animal that tag 20 can couple to. Illustrative items that may include tag 20 and/or that may otherwise be coupled to tag 20 include key fobs, key chains, wallets, shoes, bags, backpacks, purses, notebooks, books, pens, pet collars, clothing, hats, glasses, sunglasses, headphones, water bottles, etc. In the example of FIG. 5, tagged items 66 include tote bag 66A, backpack 66B, and gym bag 66C, and tagged items 68 include keys 68A, wallet 68B, sunglasses 68C, notebook 68D, and shoes 68E. System 50 may include additional and or different tagged items 66 and 68, if desired.

Control circuitry 22 in one or more of electronic devices 10 may gather data from tags 20 to identify patterns in how tags 20 are typically used by a user, how tags 20 relate to one another, which tags 20 typically travel to which locations 64, which tags 20 generally remain within a given distance of one another, which tags 20 generally remain within a given distance of a user, and other patterns about how tags 20 are used over time by a user. Control circuitry 22 may, for example, use machine learning techniques to process historical tag location data and other data from tags 20 to identify patterns and make predictions about how tags 20 will be used in the future. These patterns and predictions may in turn be used to help a user interact with tags 20 and devices 10. For example, control circuitry 22 can notify a user when the user's bag (e.g., tagged item 66A, 66B, 66C, etc.) is missing items (e.g., one or more of tagged items 68), can notify a user of the location of specific items 68 when he or she picks up a particular bag (e.g., one of items 66), and/or may provide other output for a user based on the user's actual interactions and predicted interactions with items 66, items 68, locations 64, and devices 10.

As an illustrative example, historical tag location data from tags 20 may indicate that items 66 do not generally travel together to different locations 64. Instead, the historical tag location data may show that tag 20 on tote bag 66A usually travels with the user to the beach at location 64A (without tags 20 on items 66B and 66C), tag 20 on backpack 66B usually travels with the user to work at location 64B (without tags 20 on items 66A and 66C), and tag 20 on gym bag 66C usually travels with the user to the gym at location 64C (without tags 20 on items 66A and 66B).

On the other hand, tag location data from tags 20 may indicate that items 68 generally are grouped together, sometimes in different combinations depending on the location 64. For example, tag location data from tags 20 may indicate that keys 68A and wallet 68B are generally in the same location 64 (e.g., within a certain distance of one another, within a certain distance of the user, within a certain distance of one or both of devices 10A and 10B, etc.). The tag location data may show that tag 20 on sunglasses 68C typically travels with tag 20 on tote back 66A to the beach at location 64A, tag 20 on notebook 68D typically travels with tag 20 on backpack 66B to the user's place of work at location 64B, tag 20 on shoes 68E typically travel with tag 20 on gym bag 66C to the gym at location 64C, etc.

Based on this tag location data, control circuitry 22 may classify tags 20 into different groups. For example, control circuitry 22 may classify tags 20 on items 66 as a first type of tags 20 (e.g., tags associated with bags for containing other items such as items 68), and may classify tags 20 on items 68 as a second type of tags (e.g., tags associated with contained items that are typically contained within other items such as items 66). By classifying tags 20 on items 66 as tags for bags (or other type of container) and tags 20 on items 68 as tags for contained items, control circuitry 22 can alert a user when there is an item missing from his or her bag. For example, control circuitry 22 may automatically notify a user when tote bag 66A is missing keys 68A, wallet 68B, or sunglasses 68C when the user travels to the beach at location 64A, may automatically notify a user when backpack 66B is missing keys 68A, wallet 68B, or notebook 68C when the user travels to work at location 64B, can automatically notify a user when gym bag 66C is missing keys 68A, wallet 68B, or shoes 68E when the user travels to the gym at location 64C, etc. Notifications, tag location information, and other output may be provided as visual output on display 14 (e.g., text, maps, live camera feeds, photographs, computer-generated visual guides such as arrows, circles, etc. that are overlaid onto a live video feed, a still photograph, or other background image, and/or other suitable visual output), audio output from speakers 34, haptic output from haptic output devices 28, and/or other suitable output.

If desired, tags 20 may be classified into different groups based on user input (e.g., user input to one or more of devices 10, user input to one or more of tags 20, and/or other suitable user input in which a user manually selects or otherwise provides classification groups for tags 20). Control circuitry 22 may also or instead classify tags 20 automatically (e.g., without requiring user input) based on data gathered from one or more tags 20 (e.g., historical location data, current location data, etc.), data gathered from one or more devices 10, and/or based on other data.

Figure 6:
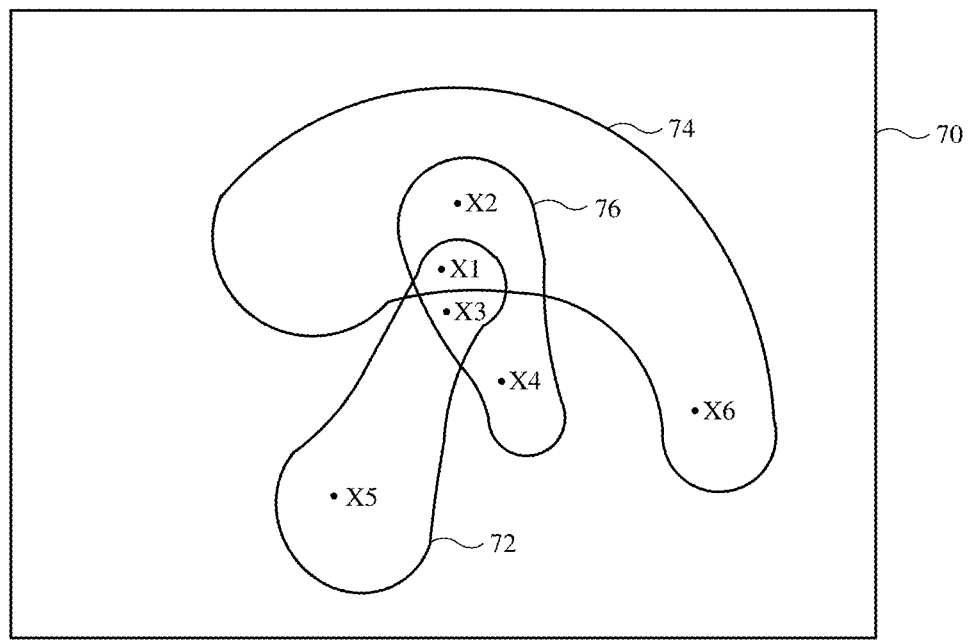
FIG. 6 is a diagram showing how historical tracking data for different tagged items and electronic devices may be used to identify patterns and relationships between electronic devices, tags, and associated tagged items in accordance with an embodiment.

FIG. 6 is a diagram showing illustrative location data gathered with tags 20 and/or one or more devices 10. Illustrative map 70 of FIG. 6 may be a heat map or other map representing recorded (e.g., historical) location data from different tags 20 and/or location data from one or more devices 10. For example, map 70 may be a two-dimensional map of the user's neighborhood, city, state, country, etc. showing where devices 10 and tags 20 (as well as the items coupled to tags 20 such as tagged items 66 and 68 of FIG. 5) have traveled over a given time period (e.g., a week, month, year, etc.). Data of map 70 may be stored on one or more of devices 10, may be stored on a server (e.g., server 60 of FIG. 4), may be stored on the cloud (e.g., a cloud computing network), may be stored on one or more of tags 20, and/or may be stored in any other suitable location.

Region 72 represents illustrative location data gathered over a given period of time with a first tag 20 coupled to a first item (e.g., one of items 66 or 68 of FIG. 5 or other suitable tagged item), region 74 represents illustrative location data gathered over the given period of time with a second tag 20 coupled to a second item (e.g., one of items 66 or 68 of FIG. 5 or other suitable tagged item), and region 76 represents illustrative location data gathered over the given period of time with a user's electronic device 10 (e.g., one of devices 10A and 10B of FIG. 5 or other suitable device 10).

Using the historical location data of FIG. 6, control circuitry 22 may determine that the first tag 20 associated with location data 72 tends to travel to locations X1, X3, and X5 but does not tend to travel to locations X2, X4, and X6; the second tag 20 associated with location data 74 tends to travel to locations X1, X2, and X6 but does not tend to travel to locations X3, X4, and X5; and device 10 associated with location data 76 tends to travel to locations X1, X2, X3, and X4 but does not tend to travel to locations X5 and X6.

Based on this information, control circuitry 22 may identify patterns and make predictions about how a user interacts with tags 20 and devices 10. For example, if location data 76 from device 10 indicates that device 10 tends to go to location X1 on a certain day and time, control circuitry 22 can predict that the user will want to know the locations of the two tags 20 that also tend to accompany device 10 to location X1 at that day and time (based on the fact that both tags 20 typically travel to location X1 with device 10, as shown in FIG. 6). Control circuitry 22 may automatically provide notifications or other output that informs the user of the current location of the two tags 20 that the user will likely bring to location X1 at that day and time.

As another example, location data 76 from device 10 may indicate that device 10 tends to go to location X2 on a certain day and time. Based on the historical location data (e.g., based on the fact that the second tag 20 associated with location data 74 typically travels to location X2 with device 10, while the first tag 20 associated with location data 72 typically does not travel to location X2 with device 10, as shown in FIG. 6), control circuitry 22 can predict that the user will want to know the location the second tag 20 associated with location data 74 but may not be concerned with the location of the first tag 20 associated with location data 72. Control circuitry 22 may automatically provide notifications or other output that informs the user of the current location of the second tag associated with location data 74 that the user will likely bring to location X2 at that day and time (without necessarily notifying the user of the location of the first tag 20 associated with location data 72).

The time period over which location data is tracked for the purposes of identifying patterns and relationship between tags 20 may be any suitable time period (e.g., a day, a week, a month, etc.). Control circuitry 22 may continue to gather data such as location data of the type shown in FIG. 6 over time and may continuously or periodically update and refine the patterns and relationships based on the new data, or control circuitry 22 may conduct an initial analysis of location data from tags 20 and devices 10 and may set rules and make predictions based on this initial analysis alone.

In addition to using historical tracking data from tags 20 to keep track of previous positions of tagged items, an electronic device may also use tracking data from tags 20 to keep track of previous positions of virtual items associated with tags 20.

Tags 20 may, for example, serve as anchors and/or visual markers in a virtual reality or augmented reality system. When tag 20 is used as an anchor, device 10 (e.g., a head-mounted device or any other suitable virtual reality, augmented reality, and/or mixed reality electronic device) may map out an environment (or may receive and/or store information about a previously mapped out environment) using a virtual coordinate system that is anchored by tag 20. Device 10 may determine the location of other objects (e.g., other devices 10, other tags 20, other tagged items, other passive items, etc.) based on the location of tag 20.

In arrangements where tag 20 is used as a visual marker, tag 20 may include one or more features (e.g., physical surfaces features, infrared-reflective ink features, visible ink features, etc.) that may be detected by a camera in device 10 (e.g., an infrared camera, a visible light camera, or other suitable camera). The markers on tag 20 may help inform system 50 of the location of tag 20, the location of a virtual work surface, the location of a virtual game surface, the location of a virtual input-output surface, and/or the location of a user's hands or other body part as the user is interacting with a virtual object, a real-world object, a computing device, or other objects in system 50.

Figure 7:
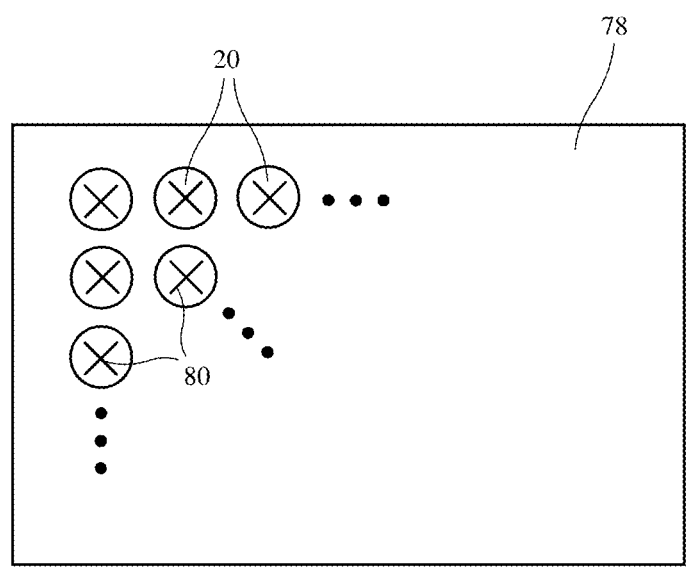
FIG. 7 is a top view of an illustrative game board with tags having virtual reality markers in accordance with an embodiment.

As shown in FIG. 7, for example, tags 20 may be used to form a virtual reality, augmented reality, and/or mixed reality environment on real-world surface 78 (e.g., a table or other real-world surface). One or more electronic devices 10 in system 50 such as a head-mounted device may be used to track the locations of tags 20 and to display objects such as virtual game pieces on surface 78 based on the locations of tags 20. For example, a virtual chess game may be played on surface 78 by displaying a virtual chess piece on each tag 20. When the user moves one of tags 20 in the game, the display in device 10 may move the corresponding virtual chess piece so that it remains on tag 20.

Device 10 may track the location of tags 20 using one or more sensors (e.g., image sensor 30 or other suitable visible light camera, infrared light camera, etc.). For example, tags 20 may include markers 80. Markers 80 may be, for example, passive visual markers such as bar codes, cross symbols, or other visually identifiable patterns (e.g., physical surfaces features, infrared-reflective ink features, visible ink features, etc.) on tags 20. Markers 80 may, if desired, include light-emitting components (e.g., visual light-emitting diodes and/or infrared light-emitting diodes modulated using identifiable modulation codes) that are detected using cameras. Markers 80 may help inform device 10 of the location of the user's virtual work surface, the location of tags 20, and the location of one or more of the user's fingers as a user is interacting with virtual objects, real-world objects, etc.

In addition to or instead of using optical sensors to track the locations of tags 20 by sensing markers 80, device 10 may track the locations of tags 20 using wireless communications circuitry 36. For example, device 10 may use location information that is transmitted from tags 20 to device 10 to track the locations of tags 20. If desired, device 10 may store a history of location data associated with each tag 20. This may be used to determine the last position of virtual objects in a virtual environment. For example, device 10 may keep track of the relative positions of tags 20 on surface 78 during a virtual chess game. When the game is paused (e.g., when the user removes the head-mounted device), device 10 may store the positions of tags 20 relative to one another at the time the game is paused. This way, even if tags 20 are moved around or stored away while the game is paused, device 10 can keep track of the last positions of the game pieces. When the game resumes, device 10 may inform the user where each tag 20 should be positioned based on the stored location information for tags 20.

Device 10 may also be used to track tagged items that are shared between multiple users. FIG. 8 is a diagram showing how multiple users such as user 82A and user 82B may wish to share a tagged item such as bike 84. Bike 84 may include tag 20 or tag 20 may otherwise be coupled to bike 84. Each user may have one or more devices 10 that receives tracking information and other data from tag 20. For example, user 82A may have device 10X that receives location data and other data from tag 20, and user 82B may have device 10Y that receives location data and other data from tag 20.

Devices 10X and 10Y may be used to facilitate interactions between user 82A and user 82B with respect to shared items such as bike 84. One or both of users 82A and 82B may create a set of rules with respect to bike 84, or one or both of devices 10X and 10Y may automatically generate a set of rules with respect to bike 84. The rules may be the same or different for each user. For example, if bike 84 belongs to user 82A and user 82A is letting user 82B borrow bike 84, then user 82A may set rules with respect to how user 82B may use bike 84. These rules may include, for example, how long user 82B may borrow bike 84 for, where user 82B can use bike 84 (e.g., boundary lines, range limits, terrain limits, etc.), where user 82B can store bike 84, where user 82B should return bike 84, etc.

Each user's device may provide output based on the location information from tag 20 and the agreed upon rules with respect to the tagged bike 84. For example, as shown in FIG. 9, control circuitry 22 in device 10X belonging to user 82A may display notification 86A on display 14X when user 82B takes bike 84 out of the pre-determined acceptable range. As shown in FIG. 10, control circuitry 22 in device 10Y belonging to user 82B may display notification 86B on display 14Y when user 82B needs to return bike 84 to user 82A based on the previously agreed upon return time. These examples are merely illustrative. In general, any suitable type of output may be used to notify one or more users of a shared tagged item based on previously agreed upon rules about how the tagged item should be used by each user.

Figure 11:
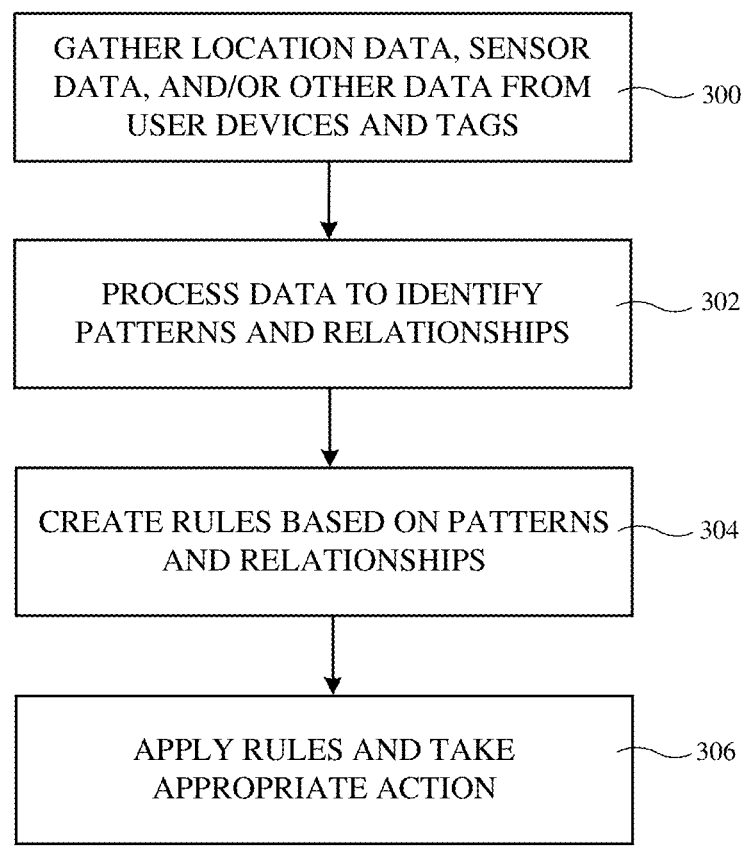
FIG. 11 is a flow chart of illustrative steps involved in operating an electronic device that is used to track multiple tagged items in accordance with an embodiment.

FIG. 11 is a flow chart of illustrative steps involved in operating an electronic device such as electronic device 10 that receives data from one or more tracking devices such as tags 20.

At step 300, control circuitry 22 may gather location data from tags 20 (e.g., historical location data showing where tags 20 previously traveled over a given period of time, current location data showing where tags 20 are located in real-time, and/or other location data), sensor data from tags 20, location data from device 10 (e.g., historical and/or current location data gathered using Global Positioning System receiver circuitry 38, wireless local area network transceiver circuitry 40, ultra-wideband transceiver circuitry 46, other wireless communications circuitry 36, and/or other circuitry of FIG. 2), sensor data from device 10 (e.g., motion sensor data from motion sensor circuitry 32, image sensor data from image sensor 30, and/or other sensor data), and/or other data (e.g., information on device 10 such as e-mails on an e-mail application, calendar events on a calendar application, restaurant reservations on a reservation application, event information on a social media application, and/or other information on device 10 that may be relevant to a user's interactions with tags 20 and tagged items such as items 66 and 68 of FIG. 5).

At step 302, control circuitry 22 may process the data gathered in step 300 to identify patterns regarding how devices 10 and tags 20 are typically used (e.g., which tags generally travel to which locations) and to identify relationships between tags 20, devices 10, and the user (e.g., which tagged items serve as bags or containers for other tagged items, which tags 20 remain together at all times, which device 10 serves as a proxy for the user's location, etc.). Control circuitry 22 may, if desired, use machine learning or other training algorithms to learn from previous user input, previous tracking data, previous sensor data, and other data (e.g., device 10 can use control circuitry 22 to implement self-learning techniques, to predict a user's location, habits, interests, activities, etc.).

At step 304, control circuitry 22 may create, refine, or change rules regarding how and when to provide output to a user based on the patterns and relationships identified in step 302. For example, control circuitry 22 may set a rule to automatically notify a user of the location of certain items (e.g., notebook 68D or other items 68) when the user leaves his or her house with a certain bag (e.g., backpack 66B or other item 66 of FIG. 5) that is missing those items. As another example, control circuitry 22 may set a rule to automatically notify a user when a distance between certain tags 20 becomes greater than a threshold (e.g., when keys 68A and 68B are too far apart, indicating that the user may have unintentionally left one of the items behind). These are just illustrative examples of the types of rules that control circuitry 22 may set regarding when and how to provide output to the user. Other types of rules may be set depending on the types of items tags 20 are coupled to, depending on how a user interacts with tags 20, etc.

At step 306, control circuitry 22 may monitor real-time location data and other data from tags 20 and real-time location data and other data from devices 10 while applying the rules determined in step 304. When one of the rules is triggered (e.g., when location data from tags 20 and/or devices 10 indicates that certain tags 20 are too far apart, that certain tags 20 have been unintentionally left behind, that certain tags 20 are too far from certain devices 10, that certain tagged items will soon be needed by the user, that certain tagged items are missing from certain bags, etc.), control circuitry 22 may take suitable action. This may include for example, providing notifications and/or real-time location updates via visual output on display 14, audio output from speakers 34, haptic output from haptic output devices 28, and/or other suitable output to a user.

As described above, one aspect of the present technology is the gathering and use of information such as information from tracking devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic device, comprising:
ultra-wideband receiver circuitry configured to receive first location data from a first tag and second location data from a second tag;
control circuitry configured to determine an acceptable distance between the first and second items based on the first location data and the second location data, wherein the first location data and the second location data comprise historical data that indicates where the first and second tags have traveled over a given period of time; and
a display configured to display a notification when a distance between the first and second tags is greater than the acceptable distance.

2. The electronic device defined in claim 1 wherein the ultra-wideband receiver circuitry is configured to receive a first real-time location from the first tag and a second real-time location from the second tag, and wherein the control circuitry is configured to determine the distance between the first and second items based on the first real-time location and the second real-time location.

3. The electronic device defined in claim 2 wherein the control circuitry is configured to predict when the electronic device is headed to a given destination and the display is configured to automatically display the first real-time location and the second real-time location when it is predicted that the electronic device is headed to the given destination.

4. The electronic device defined in claim 2 wherein the display is configured to display the first real-time location and the second real-time location based on a time of day.

5. The electronic device defined in claim 2 wherein the display is configured to display the first real-time location and the second real-time location based on the historical data.

6. The electronic device defined in claim 1 wherein the control circuitry is configured to use machine learning to determine the acceptable distance between the first and second tags.

7. The electronic device defined in claim 1 wherein the first tag is coupled to a first tagged item and the second tag is coupled to a second tagged item and wherein the control circuitry is configured to classify the first tagged item as a container for the second tagged item based on the first location data and the second location data.

8. The electronic device defined in claim 7 wherein the control circuitry uses machine learning to classify the first tagged item as the container for the second tagged item.

9. The electronic device defined in claim 7 wherein the notification comprises an alert that the second tagged item is missing from the first tagged item.

10. An electronic device, comprising:
ultra-wideband receiver circuitry configured to receive location data from a tag, wherein the location data comprises historical location data;
control circuitry configured to determine an acceptable distance between the electronic device and the tag based on the historical location data; and
a display configured to display a notification when a distance between the tag and the electronic device is greater than the acceptable distance.

11. The electronic device defined in claim 10 wherein the control circuitry analyzes the historical location data using machine learning to determine the acceptable distance between the electronic device and the tag.

12. The electronic device defined in claim 10 wherein the display is configured to display a current location of the tag when the distance is greater than the acceptable distance.

13. The electronic device defined in claim 10 wherein the control circuitry is configured to predict when the electronic device is headed to a given destination and the display is configured to automatically display a current location of the tag when it is predicted that the electronic device is headed to the given destination.

14. The electronic device defined in claim 13 wherein the control circuitry is configured to analyze historical tracking data associated with the electronic device to predict when the electronic device is headed to the given destination.

15. An electronic device, comprising:
ultra-wideband receiver circuitry configured to receive location data from a tag, wherein the location data indicates a current location of the tag;
control circuitry configured to predict when the electronic device is headed to a given destination; and
a display configured to display the current location of the tag when it is predicted that the electronic device is headed to the given destination.

16. The electronic device defined in claim 15 wherein the control circuitry is configured to analyze historical tracking data associated with the electronic device to predict when the electronic device is headed to the given destination.

17. The electronic device defined in claim 16 wherein the tag is part of a set of tags that is tracked by the electronic device and wherein the control circuitry is configured to analyze historical location data associated with the set of tags to determine which of the tags tended to travel with the electronic device to the given destination over a given period of time.

18. The electronic device defined in claim 17 wherein the control circuitry is configured to use machine learning to predict when the electronic device is headed to the given destination and to determine which of the tags tended to travel with the electronic device to the given destination over the given period of time.

19. The electronic device defined in claim 15 wherein the tag is part of a set of tags that is tracked by the electronic device, wherein the set of tags includes a first tag coupled to a first tagged item and a second tag coupled to a second tagged item, wherein the control circuitry is configured to classify the first tagged item as a container for the second tagged item, and wherein the display is configured to display an alert when the second tagged item is missing from the first tagged item.

* * * * *